Feb. 23, 1932.                C. H. HAPGOOD                1,846,805
                              MILKING MACHINE
                           Filed Jan. 14, 1930          2 Sheets-Sheet 1
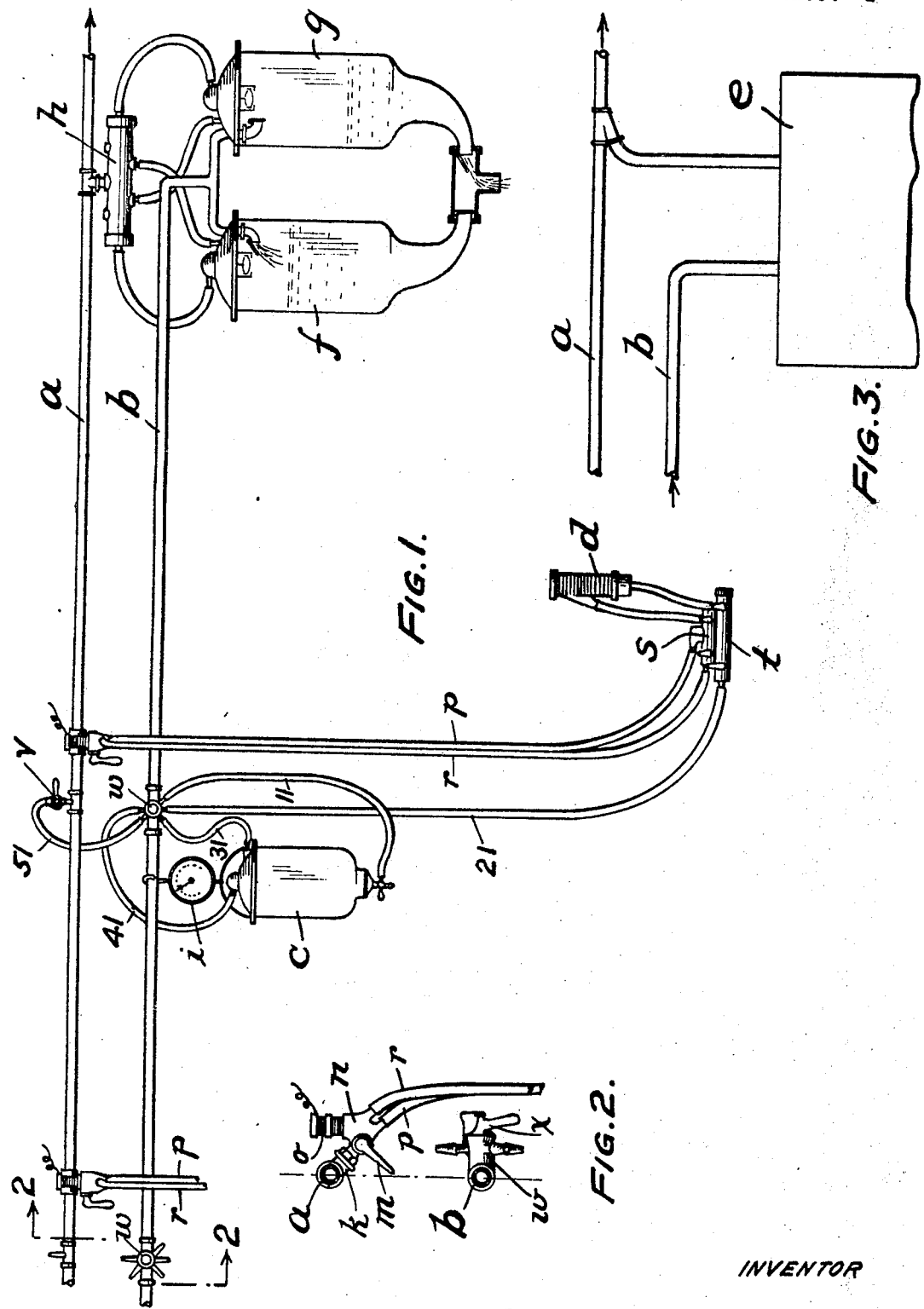
INVENTOR
Cyrus Howard Hapgood
BY
Busser and Harding
ATTORNEYS.

Patented Feb. 23, 1932

1,846,805

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

MILKING MACHINE

Application filed January 14, 1930. Serial No. 420,669.

In an application filed by me February 2, 1929, Serial No. 336,998, I set forth a milking machine comprising teat cups, a milk pail having a milk inlet and a milk outlet, a milk pipe line connected with a source of vacuum, other conduits, and means, comprising a single valve, to connect, through certain of said conduits, the milk inlet to the pail with the teat cups and the upper part of the pail with the milk pipe line, and alternately therewith to connect, through certain of said conduits, the upper part of the pail with the atmosphere and the milk outlet from the pail with the milk pipe line.

Said milking machine is operative and satisfactorily so except under conditions where the installation requires the lifting of the milk to a higher elevation, which creates fluctuations in the vacuum within the milk chambers of the teat cups, as hereinafter explained in detail. The object of the present invention is to eliminate said vacuum fluctuations. The present invention comprises improvements whereby this object is accomplished. These improvements also have other decided advantages, among the more important of which are the elimination of the barn air from the milk and a substantial reduction in the cost of installation. The invention also comprises improvements in the construction of the master control valve and the connections therefrom.

In the drawings, which show a preferred embodiment of a milking apparatus embodying my invention—

Fig. 1 is an elevational view of part of a complete milking apparatus.

Fig. 2 is a section, somewhat enlarged, on the line 2—2 of Fig. 1.

Fig. 3 is an elevation showing pipe connections to a storage tank, in place of the releaser of Fig. 1.

Figure 4:
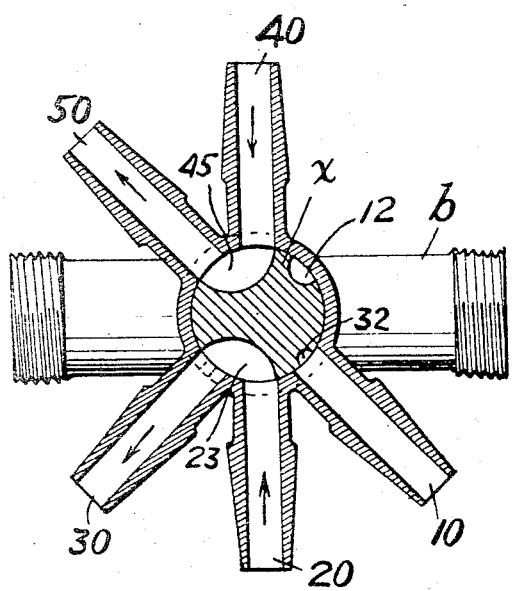
Figs. 4 and 5 are views showing the main control valve and radiating nozzles in cross-section and the milk pipe in elevation; the valve being shown in different operative positions in the two figures.

The complete milking apparatus comprises a vacuum pump, an air pipe $a$ and a milk pipe $b$ both communicating with the vacuum pump and both extending into the cow barn, milking machine units adapted to be connected with said pipes at different points along their length and a milk receiver, which may be a releaser, of which a preferred type is shown in Fig. 1, or storage tank such as shown in Fig. 3.

Each milking machine unit comprises a milk receiver $c$ adapted to receive and weigh the milk from individual cows and which is hereinafter called a pail, a set of teat cups, of which, one, $d$, is shown, and hose connections, as hereinafter described, from the teat cups to the pail, from the teat cups to the vacuum pipe line $a$, and from the pail to the vacuum pipe line $a$ and the milk pipe line $b$.

The vacuum pump is not shown. It connects direct with the vacuum pipe line $a$. It may also connect direct with a storage tank $e$, as shown in Fig. 3; or it may connect, through a valve, with the releaser shown in Fig. 1. Whether the milk goes to a releaser, as shown in Fig. 1, and thence to a storage tank, or goes direct to a storage tank as shown in Fig. 3, the milk pipe $b$ is under constant partial vacuum, by reason of the vacuum prevailing in the releaser or storage tank.

The twin releaser shown in Fig. 1 comprises two receptacles $f$ and $g$, both connected with milk pipe $b$. One receptacle is under vacuum while the other is under a higher absolute pressure, preferably atmospheric. Milk is delivered to the receptacle under vacuum. By means of a valve in valve chamber $h$, either receptacle may be placed under vacuum while the other is connected with atmosphere. When the receptacle under vacuum is filled to a predetermined height, the valve is shifted to reverse the air connections and the milk discharges from the filled receptacle. The valve in valve chamber $h$ may be hand-operated; or it may be automatically operated as more particularly described in an application filed by me December 18, 1929, Serial No. 415,098. A particular description in this specification of the twin releaser and its operation is unnecessary, as it forms no part of the present invention.

Each individual milk pail $c$ may comprise a glass body confined between metal plates. The pail may be suspended from scales $i$, which may be suspended from any convenient support, such as the milk pipe $b$. The preferred specific construction of the milk pail is more particularly disclosed in an application filed by me February 2, 1929, Serial No. 336,998, but such specific construction forms no part of the present invention.

Each milking machine unit also comprises an electro-magnetic pulsator, which may be of any desired type, such, for example, as disclosed in an application filed by me December 24, 1927, Serial No. 242,331. A general view of this pulsator is shown in Figs. 1 and 2. It comprises a nozzle $k$ communicating with a vacuum chamber within a casing $n$; the connection being opened and closed by a valve $m$. Casing $n$ has two nozzles. One nozzle is open to said vacuum chamber, and is connected, or adapted to be connected, with a vacuum hose $p$. The other nozzle, which is open to a pneumatic pulsation chamber (not shown) within casing $n$, is connected, or adapted to be connected, with a pneumatic pulsation hose $r$. An electromagnet $o$, which is alternately energized and de-energized, controls the operation of a valve (not shown) which connects the said pulsation chamber and hose $r$ with said vacuum chamber and atmosphere alternately.

The vacuum hose $p$ and the pulsation hose $r$ connect with the valve chamber $s$ of a claw, the operation of the valve in this valve chamber being controlled by the pulsations in hose $r$ and producing pneumatic pulsations in the outer or pulsation chambers of the teat cups $d$. The inner or milk chambers of the teat cups communicate, through the milk chamber $t$ of the claw, with the milk hose 21. The teat cups and claw shown and briefly described are well known in the art and need not be described in further detail; the construction shown in the Leitch Patent No. 1,255,186, February 5, 1918, being preferred. The claw and the vacuum hose $p$ may be omitted and the pulsation hose $r$ may connect direct with the pulsation teat cup chambers, and the milk teat cup chambers may connect direct with the hose 21, as is also well understood in the art.

The magnetic pulsator described may be controlled from a primary pulsator operated by primary power devices, as is also well understood in the art.

On the milk pipe line $b$ is mounted a conical valve chamber $w$ in open communication with said pipe. Radiating from the valve chamber are five nozzles 10, 20, 30, 40 and 50.

Nozzle 10 connects with a milk hose 11 leading to the bottom of the milk pail $c$. Nozzle 20 connects with the above mentioned milk hose 21. Nozzle 30 connects with a milk air hose 31 leading to a nozzle on the pail top. Nozzle 40 connects with a vacuum hose 41 leading to another nozzle on the pail top. Nozzle 50 connects with a vacuum hose 51 leading to a nozzle on vacuum pipe line $a$, which may be controlled by a valve $v$; such valve, however, not being indispensable.

In valve chamber $w$ is seated a plug valve $x$, which is provided with four channels, namely, an arcuate milk port 23, an arcuate air port 45, a milk passage 12 in open communication with milk pipe $b$, and an atmospheric port 32.

When the valve $x$ is turned into the position shown in Fig. 4, port 45 connects nozzles 40 and 50 and thereby connects the top of the pail $c$ and hose 41 with vacuum hose 51 and the vacuum pipe $a$, and thereby establishes a vacuum in the top of the pail; and port 23 connects nozzles 20 and 30, thereby drawing milk from the teat cups $d$ and hose 21 through port 23 and hose 31 into the pail $c$.

Figure 5:
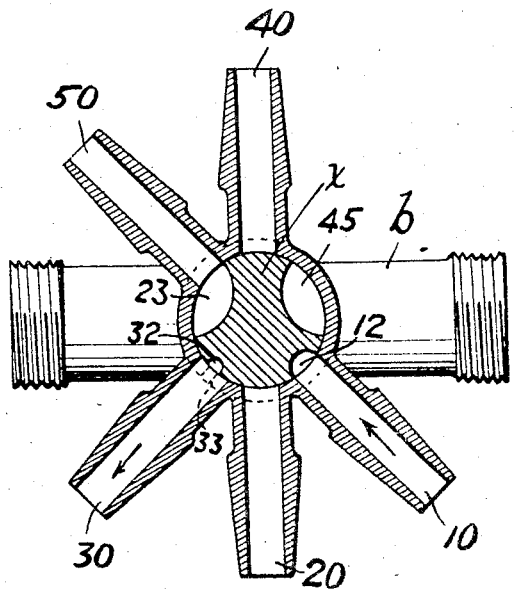
Figure 6:
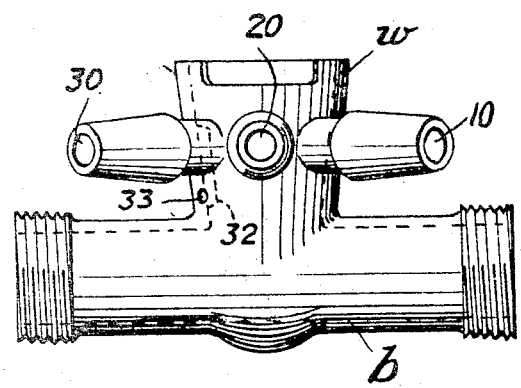
Fig. 6 is an elevational view of the valve structure of Figs. 4 and 5.
Figure 7:
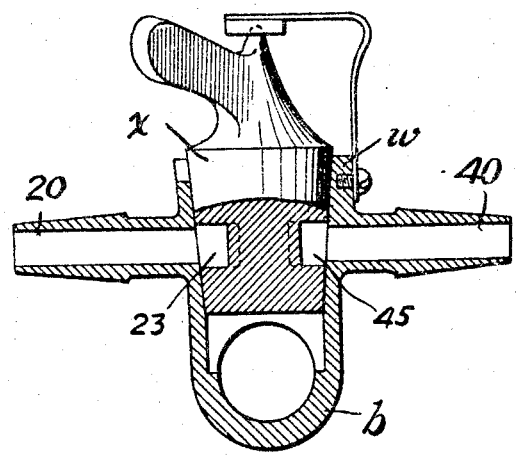
Fig. 7 is a sectional view showing the valve and two of said nozzles in longitudinal section and the milk pipe in cross-section.
Figure 8:
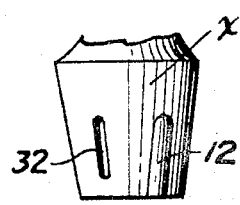
Fig. 8 is a side view of the tapered plug valve.

When the valve $x$ is turned into the position shown in Fig. 5 the above described connections are cut off, and air passage 32 is brought in communication with nozzle 30 and with a port 33 in the valve chamber, so that air flows into the top of the pail $c$, and passage 12 is brought into communication with nozzle 10. The air pressure in the pail therefore forces the milk out of the bottom of the pail through hose 11, nozzle 10, and passage 12 into the milk pipe $b$, whence it is conveyed to tank $e$, releaser $f$, $g$, or other receptacle.

When the valve $x$ is turned into an intermediate position, which may be called a neutral position, all the above connections are cut off.

From the foregoing description it will be observed that no air is exhausted from the milking unit into the milk pipe line $b$, the exhaustion being from the pail top direct into the vacuum line. Thereby there is no other contact of barn air with the milk than the superficial contact that exists when air pressure is driving the milk out the pail bottom into the milk pipe line. This air is not exhausted into the milk pipe line and therein mixed with the milk, but, as above stated, is exhausted direct into the air pipe line $a$.

This mode of operation offers other advantages. When, at predetermined intervals, the outer or pulsation chamber of a teat cup is put under vacuum, it is highly desirable that such vacuum shall balance the continuous vacuum in the inner or milk chamber of the teat cups. If, at such times, the degrees of vacuum in the two teat cup chambers are substantially different, the operation is defective. In the ordinary system in which the air from the milking unit is exhausted into the milk line, if such milk, in the course of its flow from the teat cups, is raised to a substantial height by the pull of the vacuum, as is often necessary in the use of the releaser system, great fluctuations occur in the continuous vacuum in the inner teat cup chambers. In my improvement, the milk line and the vacuum line are independent, the milk may be raised to any height to which the vacuum can pull it, and the specified fluctuations cannot occur.

Another advantage is that since the milk pipe line is used only for conveyance of milk and not for exhaustion of air from the milking unit, a much smaller milk pipe line can be used. This permits a saving of expense that constitutes a material proportion of the total cost of installation.

I do not herein claim the novel process of milking which the machine herein described is adapted to practice, since such process forms the subject-matter of a separate application filed of even date herewith, Serial No. 420,671.

Having now fully described my invention, what I claim and desire to protect by Letters Patent is:

1. In a milking machine, the combination with a milk pipe line, a vacuum pipe line and teat cups, of means to connect the teat cups with the vacuum pipe line and thereby withdraw milk from the teat cups and alternately therewith to apply pressure fluid to the so withdrawn milk and deliver it to the milk pipe line.

2. In a milking machine, the combination with a milk pipe line, a vacuum pipe line and teat cups, of means to connect the teat cups with the vacuum pipe line and thereby withdraw milk from the teat cups and alternately therewith to apply pressure fluid to the so withdrawn milk and deliver it to the milk pipe line; said means comprising conduits and a single valve which is movable into different positions to establish connections between said conduits adapted to effect the specified alternate operations.

3. In a milking machine, the combination with a milk pipe line, a vacuum pipe line, teat cups and a milk pail, of means, including conduits, to control the transfer of milk from the teat cups to the pail and thence to the milk pipe line and the admission of air to and its exhaust from the pail, said means also including valve mechanism adapted to place the pail in communication with a source of pneumatic pressure and with the milk pipe line and adapted, alternately therewith, to connect the pail with the milk chambers of the teat cups and with the vacuum pipe line, thereby exhausting the previously admitted air independently of the milk pipe line.

4. In a milking machine, the combination with a milk pipe line, a vacuum pipe line, teat cups and a milk pail, of means, including conduits, to control the transfer of milk from the teat cups to the pail and thence to the milk pipe line and the admission of air to and its exhaust from the pail, said means also including valve mechanism controllable from a single point and movable into one position to connect the pail with a source of pressure and with the milk pipe line and movable into another position to connect the pail with the milk chambers of the teat cups and with the vacuum pipe line.

5. In a milking machine, the combination with a milk pipe line, a vacuum pipe line, teat cups and a milk pail, of a milk conduit between the teat cups and the milk pail, a milk conduit between the milk pail and the milk pipe line, a pressure fluid port, and a vacuum conduit between the milk pail and the vacuum pipe line, of means to open the second conduit and the pressure port to the pail and alternately therewith to open the first conduit and the vacuum conduit to the pail.

6. In a milking machine, the combination with a milk pipe line, a vacuum pipe line, teat cups and a milk pail, of a milk conduit between the teat cups and the milk pail, a milk conduit between the milk pail and the milk pipe line, a pressure fluid port, and a vacuum conduit between the milk pail and the vacuum pipe line, of means, including a single master multiple-ported valve, operative to open the second conduit and the pressure port to the pail and alternately therewith to open the first conduit and the vacuum conduit to the pail.

7. In a milking machine, the combination with a milk pipe line, a vacuum pipe line, teat cups and a milk pail, of conduits, and means to connect, through certain of said conduits, the pail with a source of pressure and with the milk pipe line and alternately therewith, to connect, through certain of said conduits, the pail with the teat cups and with the vacuum pipe line.

8. In a milking machine, the combination with a milk pipe line, a vacuum pipe line, teat cups and a milk pail, of conduits, and means to connect, through certain of said conduits, the pail with a source of pressure and with the milk pipe line and alternately therewith, to connect, through certain of said conduits, the pail with the teat cups and with the vacuum pipe line, said means comprising a single valve movable into different positions to establish both said alternate connections.

9. In a milking machine, the combination with a milk pipe line, a vacuum pipe line, teat cups and a milk pail provided with a milk inlet, a milk outlet and an air outlet, of a main control valve, and conduits controlled thereby connected respectively to the teat cups, to the milk inlet to the pail, to the vacuum pipe line, to the air outlet from the pail, to the milk outlet from the pail and to the milk pipe line, said valve being movable into one position to establish communication between the first two specified conduits and between the second two specified conduits and movable into another position to establish communication between the last two specified conduits and to connect the pail with pressure fluid.

10. In a milking machine, the combination with a milk pipe line and a vacuum pipe line, of a valve and five pipes radiating therefrom, namely, two milk inflow pipes, a milk outflow pipe, an air inflow pipe, and an air outflow pipe connected with the vacuum pipe line; said valve being movable into one position to connect one of the milk inflow pipes with the milk outflow pipe and to connect the air inflow pipe with the air outflow pipe, and being movable into another position to connect the other milk inflow pipe with the milk pipe line.

11. In a milking machine, the combination with a milk pipe line and a vacuum pipe line, of a valve and five pipes radiating therefrom, namely, two milk inflow pipes, a milk outflow pipe, an air inflow pipe, and an air outflow pipe connected with the vacuum pipe line; said valve being movable into one position to connect one of the milk inflow pipes with the milk outflow pipe and to connect the air inflow pipe with the air outflow pipe, and being movable into another position to connect the other milk inflow pipe with the milk pipe line, there being also an air port which the valve, in its last named position, connects with the milk outflow pipe.

In testimony of which invention, I have hereunto set my hand, at city of New York, on this 10th day of January, 1930.

CYRUS HOWARD HAPGOOD.